(12) United States Patent
Itano et al.

(10) Patent No.: US 10,484,794 B2
(45) Date of Patent: Nov. 19, 2019

(54) LOUDSPEAKER DIAPHRAGM, LOUDSPEAKER, AND PRODUCTION METHOD FOR LOUDSPEAKER DIAPHRAGM

(71) Applicant: Panasonic Intellectual Property Management Co., Ltd., Osaka (JP)

(72) Inventors: Tetsushi Itano, Osaka (JP); Seiji Takagi, Osaka (JP); Kenji Endou, Fukushima (JP); Kazuaki Nishimura, Okayama (JP); Makoto Kurozawa, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/031,496

(22) Filed: Jul. 10, 2018

(65) Prior Publication Data

US 2018/0324526 A1    Nov. 8, 2018

Related U.S. Application Data

(63) Continuation of application No. PCT/JP2017/001636, filed on Jan. 19, 2017.

(30) Foreign Application Priority Data

Jan. 28, 2016    (JP) .................. 2016-014781

(51) Int. Cl.
  *H04R 7/12*    (2006.01)
  *H04R 31/00*    (2006.01)
  (Continued)

(52) U.S. Cl.
  CPC ............ *H04R 7/12* (2013.01); *H04R 31/003* (2013.01); *B29C 45/0005* (2013.01);
  (Continued)

(58) Field of Classification Search
  CPC ............... H04R 9/025; H04R 2207/00; H04R 2209/024; H04R 2231/003;
  (Continued)

(56) References Cited

U.S. PATENT DOCUMENTS 5,632,943 A * 5/1997 Lin .................... B29C 70/025
  264/103
2006/0266577 A1* 11/2006 Inoue .................... H04R 7/10
  181/167

(Continued)

FOREIGN PATENT DOCUMENTS

EP    944292 A2 *  9/1999 ........... H04R 31/003
JP    6-178385    6/1994
  (Continued)

OTHER PUBLICATIONS

International Search Report of PCT application No. PCT/JP2017/001636 dated Mar. 28, 2017.

*Primary Examiner* — Alexander Krzystan
(74) *Attorney, Agent, or Firm* — Greenblum & Bernstein, P.L.C.

(57) ABSTRACT

A loudspeaker diaphragm includes resin and hollow glass member particles contained in the resin. Further, a loudspeaker includes the above-described loudspeaker diaphragm, a magnetic circuit, a frame connected to the magnetic circuit, and a voice coil body having one end connected to the loudspeaker diaphragm and the other end disposed inside a magnetic gap in the magnetic circuit.

7 Claims, 4 Drawing Sheets

(51) Int. Cl.
  *B29C 45/00* (2006.01)
  *B29C 45/56* (2006.01)
  *B29K 23/00* (2006.01)
  *B29K 309/10* (2006.01)
  *B29K 509/08* (2006.01)
  *B29L 31/38* (2006.01)

(52) U.S. Cl.
  CPC ........ *B29C 45/0013* (2013.01); *B29C 45/561* (2013.01); *B29C 2045/0008* (2013.01); *B29K 2023/12* (2013.01); *B29K 2309/10* (2013.01); *B29K 2509/08* (2013.01); *B29L 2031/38* (2013.01); *H04R 2307/023* (2013.01); *H04R 2307/025* (2013.01); *H04R 2307/029* (2013.01)

(58) Field of Classification Search
  CPC ................ H04R 2307/204; H04R 7/10; H04R 2307/027; H04R 7/00; H04R 7/06; H04R 2307/025

USPC .................................. 381/400, 184, 399, 398
  See application file for complete search history.

(56) References Cited

U.S. PATENT DOCUMENTS

| | | | |
|---|---|---|---|
| 2007/0131478 A1* | 6/2007 | Okazaki | H04R 7/12 181/167 |
| 2011/0164764 A1 | 7/2011 | Jin et al. | |
| 2016/0014520 A1* | 1/2016 | Miura | H04R 7/125 181/164 |

FOREIGN PATENT DOCUMENTS

| | | |
|---|---|---|
| JP | 6-284496 | 10/1994 |
| JP | 2009-171386 | 7/2009 |

* cited by examiner

LOUDSPEAKER DIAPHRAGM, LOUDSPEAKER, AND PRODUCTION METHOD FOR LOUDSPEAKER DIAPHRAGM

CROSS-REFERENCE TO RELATED APPLICATIONS

This application is a continuation of the PCT International Application No. PCT/JP2017/001636 filed on Jan. 19, 2017, which claims the benefit of foreign priority of Japanese patent application No. 2016-014781 filed on Jan. 28, 2016, the contents all of which are incorporated herein by reference.

BACKGROUND

1. Technical Field

The present disclosure relates to a loudspeaker diaphragm used in a variety of audio devices and video devices, a loudspeaker provided with the loudspeaker diaphragm, and a production method for the loudspeaker diaphragm.

2. Description of the Related Art

Conventionally, paper is used as a material of a loudspeaker diaphragm, for example. Meanwhile, for a vehicle-mounted loudspeaker or the like, a resin loudspeaker diaphragm is also used from the viewpoint of moisture absorbency. The resin loudspeaker diaphragm is formed by injection molding molten resin into a mold which has been set in advance to have a given shape. Further, polypropylene is popularly used as a kind of materials for the resin loudspeaker diaphragm.

In addition, regarding adjustment of acoustic characteristics with the resin loudspeaker diaphragm, characteristics as a loudspeaker and audio quality are adjusted by mixing a material such as a fibrous material into a matrix resin of the loudspeaker diaphragm, or specific gravity of the loudspeaker diaphragm is reduced by means of foaming to increase sound pressure.

For example, in a loudspeaker diaphragm disclosed in Unexamined Japanese Patent Publication No. 2009-171386, carbonized bamboo material is mixed into resin for adjusting acoustic characteristics.

SUMMARY

A loudspeaker diaphragm according to the present disclosure includes resin and hollow glass member particles contained in the resin.

According to the configuration of the present disclosure where the hollow glass member particles are contained in the resin, the loudspeaker diaphragm can achieves both high rigidity and reduction in weight, thus, has a high degree of freedom of adjusting acoustic characteristics and audio quality, and can ensure moisture resistance reliability and strength. Therefore, the acoustic characteristics and audio quality of a loudspeaker provided with the loudspeaker diaphragm can be improved.

DETAILED DESCRIPTION OF PREFERRED EMBODIMENTS

Prior to describing exemplary embodiments of the present disclosure, problems found in a conventional loudspeaker will be briefly discussed herein. Due to remarkable advance in digital technology, performance of audio devices and video devices has been dramatically improved as compared to conventional devices. Also, a loudspeaker that is used for these devices and finally emits sound has been strongly demanded in the market to have audio quality with low distortion, a wider band, and a higher dynamic range so as to emit more realistic sound.

In addition, audio devices and video devices have been widely mounted to a movable object such as a vehicle, and therefore, they have been demanded to have improved moisture resistance and heat resistance.

The present disclosure is accomplished in view of the foregoing demands, and provides a loudspeaker diaphragm that can increase a degree of freedom of adjusting characteristics and audio quality of a loudspeaker and can ensure moisture resistance reliability and strength, a loudspeaker, and a production method for the loudspeaker diaphragm.

Exemplary embodiments of a loudspeaker diaphragm, a loudspeaker, and a production method for the loudspeaker diaphragm according to the present disclosure will now be described below with reference to the drawings. Noted that the following exemplary embodiments merely illustrate examples of the loudspeaker diaphragm, the loudspeaker, and the production method for the loudspeaker diaphragm according to the present disclosure. Therefore, the scope of the present disclosure is defined by the recitations in the claims with the following exemplary embodiments used as references and thus is not limited to the following exemplary embodiments only. Therefore, among constituent elements in the following exemplary embodiments, constituent elements that are not recited in any one of the independent claims indicating the most generic concepts of the present disclosure are not necessarily essential for achievement of the object of the present disclosure but are described as preferable components.

The drawings are schematic views in which emphasis, omission, and proportion adjustment are made as required for illustration of the present disclosure and may have shapes, positional relationships and proportions that differ from actual shapes, actual positional relationships, and actual proportions.

First Exemplary Embodiment

Figures 1, 2:
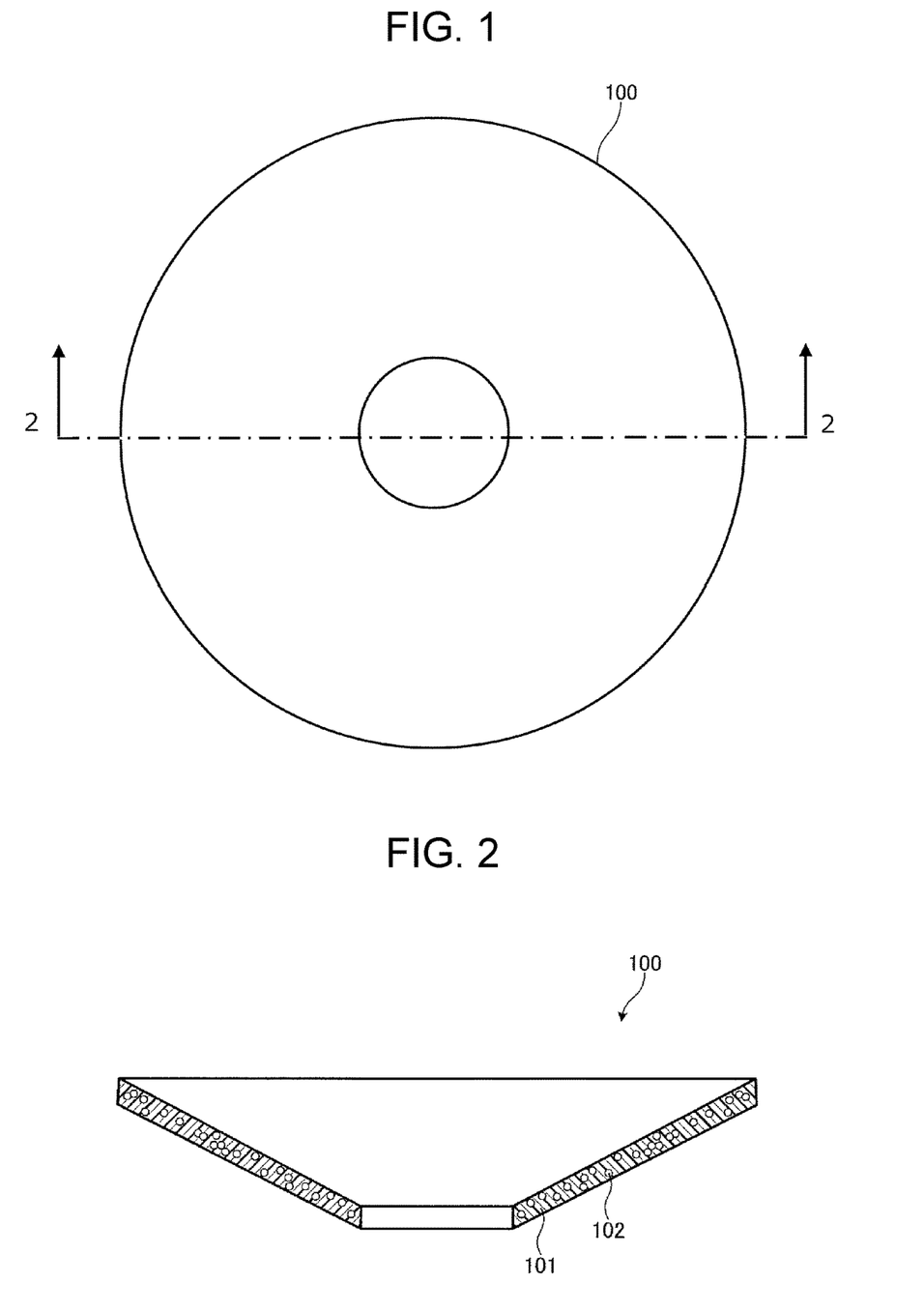
FIG. 1 is a plan view of a diaphragm according to a first exemplary embodiment of the present disclosure.
FIG. 2 is a sectional view along line 2-2 in FIG. 1.

FIG. 1 is a plan view of a diaphragm according to a first exemplary embodiment of the present disclosure. FIG. 2 is a sectional view along line 2-2 in FIG. 1.

As illustrated in FIGS. 1 and 2, loudspeaker diaphragm 100 includes resin 101 and hollow glass member particles 102 dispersively disposed in resin 101. In the present exemplary embodiment, loudspeaker diaphragm 100 is formed such that a material prepared by mixing hollow glass member particles 102 into a pelletized resin raw material is melted and injection molded.

The shape of loudspeaker diaphragm 100 is not particularly limited. For example, loudspeaker diaphragm 100 may have a three-dimensional shape such as a cone shape as in the present exemplary embodiment, besides a flat shape such as a disc shape and a rectangular plate shape.

Resin 101 mainly constituting loudspeaker diaphragm 100, that is, a so-called matrix resin, is not particularly limited, and is selected according to desired characteristics. Specifically, examples of resin 101 used for loudspeaker diaphragm 100 include crystalline olefin resin and amorphous olefin resin. The use of olefin resin for loudspeaker diaphragm 100 improves moldability. Further, an optimum physical property value as the resin material can be obtained by selectively using crystalline resin and amorphous resin according to purpose.

Hollow glass member particles 102 forms a filler for adjusting physical properties, such as density and rigidity, of loudspeaker diaphragm 100 made of resin. Hollow glass member particles 102 are contained in resin 101 of loudspeaker diaphragm 100, whereby the weight of loudspeaker diaphragm 100 can be reduced, and the rigidity of loudspeaker diaphragm 100 can be improved. In addition, loudspeaker diaphragm 100 can be made thinner, as compared to a configuration where pores are formed in loudspeaker diaphragm 100 by means of foaming, and therefore, the weight can further be reduced.

Herein, glass is not particularly limited, but a solid state of silicate glass can be given as an example of a representative component.

Further, the shape of each of hollow glass member particles 102 is not particularly limited, as long as hollow glass member particle 102 has a hollow shape. For example, hollow glass member particle 102 may have a spherical external shape.

Moreover, a thickness of each of hollow glass member particles 102 is preferably 0.6 μm or more. This is based on the knowledge that, when loudspeaker diaphragm 100 is formed by injection molding, hollow glass member particles 102 injected together with the resin raw material are not broken with a pressure during the injection molding, and desired properties of loudspeaker diaphragm 100, particularly reduction in weight and improvement in rigidity, can be obtained. The thickness of each of hollow glass member particles 102 is preferably 3 μm or less. If the thickness of hollow glass member particle 102 exceeds 3 μm, the volume of the hollow portion of hollow glass member particle 102 is decreased to increase the specific gravity of hollow glass member particle 102, and thus, the effect of the reduction in weight is hardly exerted.

Meanwhile, the average diameter of hollow glass member particles 102 is preferably selected from a range from 3 μm to 20 μm, inclusive.

If the average particle diameter of hollow glass member particles 102 is less than 3 μm, the hollow portion of hollow glass member particle 102 is not sufficiently large in volume, resulting in an increase in the specific gravity of hollow glass member particle 102. Therefore, the effect of the reduction in weight is hardly exerted.

If the average particle diameter of hollow glass member particles 102 exceeds 20 μm, some of hollow glass member particles 102 are likely to be exposed on the surface, resulting in that the diaphragm becomes fragile. Further, the flow of the resin during molding may be blocked.

If a content of hollow glass member particles 102 contained in the resin is less than 5 weight %, the effect of hollow glass member particles 102 is hardly exerted. On the other hand, the content of hollow glass member particles 102 exceeding 40 weight % leads to fragility of the diaphragm and decreases productivity and moldability due to reduction in fluidity, resulting in reducing a degree of freedom of setting a shape.

In the present exemplary embodiment, resin 101 constituting loudspeaker diaphragm 100 contains a compatibilizing agent. The compatibilizing agent is an additive that increases compatibility between resin 101 such as non-polar resin and hollow glass member particles 102 to effectively bring out the feature of hollow glass member particles 102.

For example, hydrolyzable long-chain alkylsilane can be given as an example of the compatibilizing agent. A long-chain alkyl group in the hydrolyzable long-chain alkylsilane is structurally similar to olefin resin, such as polypropylene (PP), which is non-polar, and therefore, the hydrolyzable long-chain alkylsilane can increase compatibility between the resin and hollow glass member particles 102. Note that the compatibilizing agent is not limited to the hydrolyzable long-chain alkylsilane, and so-called modified resin which is modified with silane coupling agent or maleic acid anhydride to have a polarity may be used.

It is generally preferable that the additive amount of the compatibilizing agent is in a range from 1 to 10 weight %, inclusive. If the compatibilizing agent is too little, the effect thereof cannot be obtained. On the other hand, if the compatibilizing agent is too much, the physical property of the diaphragm may be degraded.

In addition, when at least one of a reinforcing material or a material having high internal loss is added to resin 101, the physical properties of loudspeaker diaphragm 100 can be freely adjusted with high accuracy, whereby loudspeaker diaphragm 100 that can implement predetermined characteristics and audio quality can be obtained.

Figure 3:
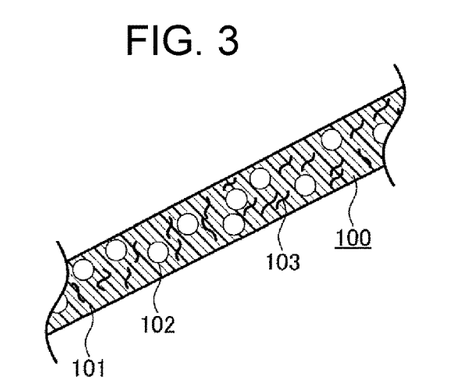
FIG. 3 is a partially enlarged sectional view of the diaphragm according to the first exemplary embodiment of the present disclosure.

FIG. 3 is a partially enlarged sectional view of loudspeaker diaphragm 100 according to the first exemplary embodiment of the present disclosure. As illustrated in FIG. 3, reinforcing material 103 is an additive contained in resin 101 for reinforcing loudspeaker diaphragm 100 and for giving an accent to sound or generating a peak in sound pressure frequency characteristics to adjust acoustic characteristics and audio quality. Reinforcing material 103 is not particularly limited. For example, a reinforcing material made of one kind of fibrous materials selected from mica, carbon fiber, aramid fiber, cellulose, glass fiber, and inorganic fiber, or a reinforcing material made of two or more of the above-mentioned fibrous materials in combination can be used.

Specifically, when mica is added to reinforcing material 103, the rigidity and elastic modulus of loudspeaker diaphragm 100 can be increased. Therefore, the upper frequency limit of the loudspeaker can be made higher, and audio quality can be improved such that a clear, well-modulated sound is provided.

The material having high internal loss is an additive for softening loudspeaker diaphragm 100 to generate internal loss to thereby adjust sound pressure frequency characteristics such that a peak of the sound pressure frequency characteristics is reduced. The material having high internal loss is not particularly limited. For example, a material having high internal loss made of one kind selected from talc, calcium carbonate, clay, and the like, or a material having high internal loss made of two or more kinds of the above-mentioned materials in combination may be used.

Figure 4:
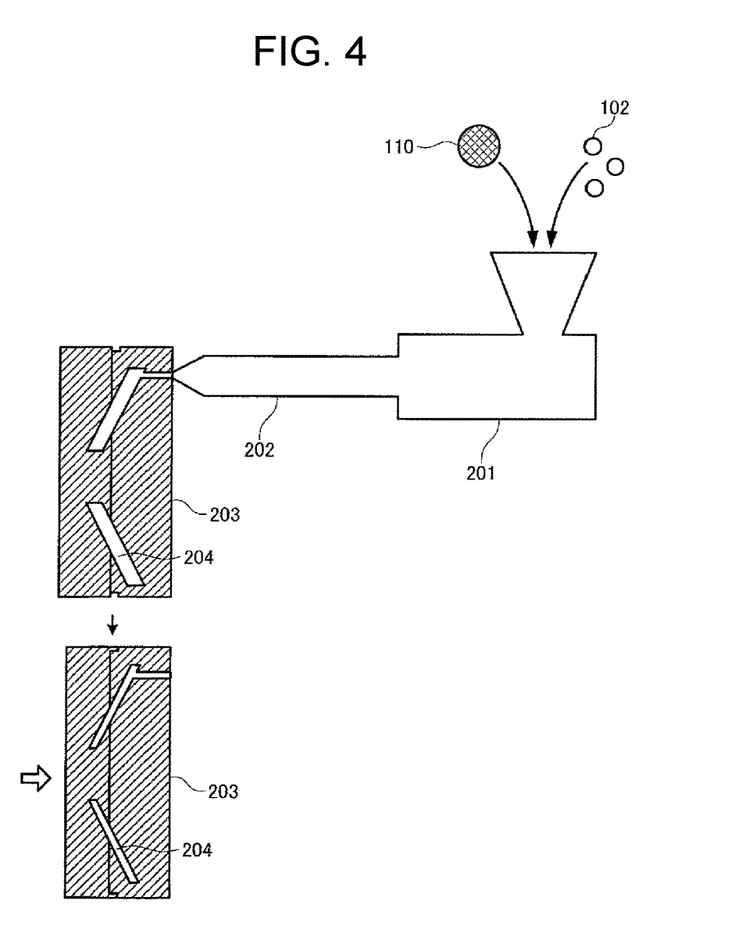
FIG. 4 is a view illustrating a production method for the diaphragm according to the first exemplary embodiment of the present disclosure.

Next, a production method for loudspeaker diaphragm 100 will be described. FIG. 4 is a view illustrating the production method for loudspeaker diaphragm 100 according to the first exemplary embodiment of the present disclosure.

The production method will be described based on an example in which polypropylene is used as resin 101. Polypropylene is generally available, and has a feature of being easily injection molded. Note that the type of resin used for loudspeaker diaphragm 100 in the present disclosure is not limited to polypropylene, and engineering plastic may be used, or biodegradable plastic typified by polylactate may be used in consideration of the environment.

The average diameter of hollow glass member particles 102 is preferably selected from a range from 3 to 20 μm, inclusive. Further, the average diameter of hollow glass member particles 102 is preferably selected from a range from 5 to 15 μm, inclusive. If the average diameter of hollow glass member particles 102 is less than 3 μm, the effect of hollow glass member particles 102 cannot be sufficiently exerted in loudspeaker diaphragm 100. On the other hand, if the average diameter exceeds 20 μm, poor dispersion of hollow glass member particles 102 occurs in resin 101, which degrades the external appearance of loudspeaker diaphragm 100 and causes unstable acoustic characteristics.

As reinforcing material 103, fibers fibrillated to a microfibrillated state (the average fiber diameter is 10 μm or less) are selected. This kind of reinforcing material 103 is added as a filler, and when resin 101 and hollow glass member particles 102 are combined, the effect of improvement in strength is efficiently exerted, and production efficiency and quality are improved.

Meanwhile, as the material having high internal loss, a material having internal loss at a frequency of a peak is selected, considering an unnecessary peak which is required to be eliminated in the sound pressure frequency characteristics.

Materials described above are selected in consideration of density, elastic modulus, internal loss, and tone which are unique to resin 101, hollow glass member particles 102, reinforcing material 103, the material having high internal loss, and other materials to be added, a resonance frequency unique to these components when these components are molded into a shape of loudspeaker diaphragm 100, and the like.

Next, as illustrated in FIG. 4, selected pelletized resin raw material 110 and hollow glass member particles 102 are input into kneading machine 201 and are heated and kneaded, and then, injected into mold 203 by injection molding machine 202. Thus, loudspeaker diaphragm 100 is formed.

During injection molding, a material prepared by kneading resin 101 and hollow glass member particles 102 is input into cavity 204 of mold 203 which is in a first state, and then, mold 203 is brought into a second state so that the volume of cavity 204 becomes smaller than the volume of cavity 204 in the first state, whereby loudspeaker diaphragm 100 having a desired shape can be obtained.

As described above, the injection molding is not performed all at once as in a conventional method, but performed over time in two stages in such a way that the state of cavity 204 which is a clearance of mold 203 is shifted to the second state from the first state. With this way, breaking of hollow glass member particles 102 can be prevented and poor dispersion can also be prevented, whereby loudspeaker diaphragm 100 having excellent performance can be stably obtained.

As described above, according to the present disclosure, loudspeaker diaphragm 100 is configured such that a material prepared by kneading resin 101 and hollow glass member particles 102 is injection molded. With this configuration, loudspeaker diaphragm 100 has a high degree of freedom of setting a physical value. Particularly, loudspeaker diaphragm 100 can ensure high internal loss and moisture resistance reliability of the resin, is excellent in external appearance, and can improve productivity and dimensional stability, by taking advantage of the low specific gravity which is the feature of hollow glass member particles 102.

Note that an antioxidant may be added to suppress reduction in physical property of resin which may be caused by thermal oxidation during kneading or molding. The addition of the antioxidant can prevent deterioration of loudspeaker diaphragm 100. Specifically, excellent intrinsic physical properties of resin 101 and hollow glass member particles 102 can be maintained, and satisfactory acoustic characteristics and audio quality obtained by kneading these materials can be achieved.

Second Exemplary Embodiment

Figure 5:
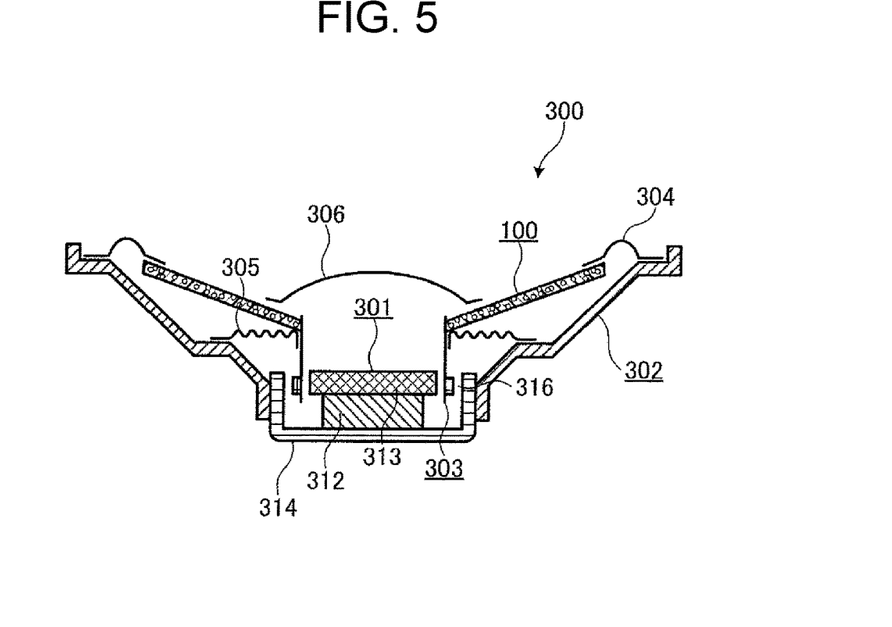
FIG. 5 is a sectional view of a loudspeaker according to a second exemplary embodiment of the present disclosure.

Next, loudspeaker 300 will be described. Hereinafter, components (portions) having effect, function, shape, mechanism, or structure similar to that in the first exemplary embodiment may be denoted by numerals or symbols same as numerals or symbols used in the first exemplary embodiment, and descriptions of the components may be omitted. Further, points of difference from the first exemplary embodiment will mainly be described below, and the description for the same configuration may not be repeated.

FIG. 5 is a sectional view of loudspeaker 300 according to a second exemplary embodiment of the present disclosure. As illustrated in FIG. 5, loudspeaker 300 includes loudspeaker diaphragm 100, magnetic circuit 301, frame 302, and voice coil body 303.

Magnetic circuit 301 includes columnar magnet 312 which is a magnetized permanent magnet, a disk-shaped plate 313 mounted on a top of magnet 312, and bottomed cylindrical yoke 314 that stores magnet 312 and plate 313. Annular magnetic gap 316 is formed between plate 313 and yoke 314.

Frame 302 is a funnel-shaped structural member connected to yoke 314 of magnetic circuit 301. Loudspeaker diaphragm 100 is disposed at a position enclosed by an upper peripheral edge of frame 302, and frame 302 and loudspeaker diaphragm 100 are bonded together via annular edge 304. Further, center cap 306 is attached to close a hole formed in the center of loudspeaker diaphragm 100.

Voice coil body 303 includes a cylindrical bobbin and a coil wound around the bobbin, and is disposed such that one end thereof is connected to the central part of loudspeaker diaphragm 100 and the other end is inserted into magnetic gap 316 of magnetic circuit 301. Further, voice coil body 303 is supported by damper 305 that is mounted between frame 302 and voice coil body 303 for connecting frame 302 and voice coil body 303 to each other in a cross-linkage manner.

The loudspeaker having magnetic circuit 301 of an internal magnet type has been described above. However, the present disclosure is not limited thereto, and may be applied to a loudspeaker having a magnetic circuit of an external magnet type.

According to the configuration described above, such a speaker can be obtained which has a high degree of freedom of adjusting characteristics and audio quality, can ensure moisture resistance reliability and strength, is excellent in external appearance, and has high productivity, as described in the first exemplary embodiment.

Third Exemplary Embodiment

Figure 6:
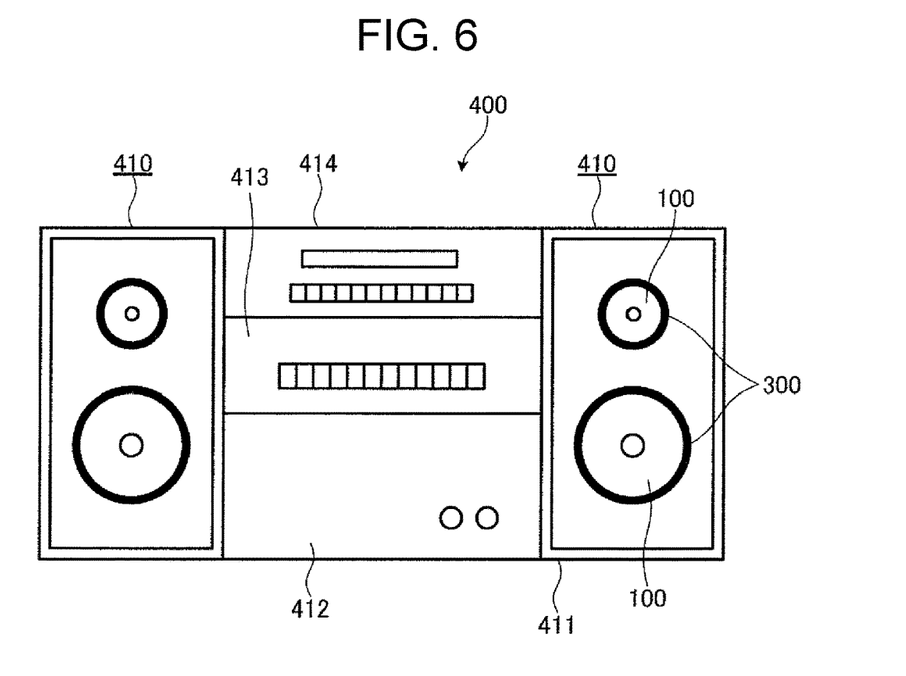
FIG. 6 is a view illustrating an external appearance of an electronic device according to a third exemplary embodiment of the present disclosure.

Hereinafter, electronic device 400 according to a third exemplary embodiment will be described. FIG. 6 is a view illustrating an external appearance of electronic device 400 according to the third exemplary embodiment of the present disclosure. Electronic device 400 is one of modes to which loudspeaker diaphragm 100 and loudspeaker 300 are applied. In the following description of the present exemplary embodiment, electronic device 400 is a mini component audio system.

Electronic device 400 includes loudspeaker systems 410 in the left part and in the right part, respectively. Each loudspeaker system 410 has two loudspeakers 300 mounted in enclosure 411.

Electronic device 400 also includes amplifier 412 including an amplifying circuit for an electric signal to be input to loudspeaker systems 410, tuner 413 and compact disk (CD) player 414 that output sources to be input to amplifier 412.

Electronic device 400 that is a mini component audio system amplifies a music signal input from tuner 413 or CD player 414 by amplifier 412, and emits sound from loudspeakers 300 mounted to loudspeaker systems 410. Specifically, voice coil body 303 vibrates relative to frame 302 due to interaction between dynamic magnetic force generated by the electric signal input to voice coil body 303 and static magnetic force generated in magnetic gap 316 of magnetic circuit 301. This vibration is transmitted to loudspeaker diaphragm 100, whereby loudspeaker diaphragm 100 vibrates. Thus, loudspeakers 300 emit sound.

This configuration enables electronic device 400 to provide excellent and high-accurate characteristics, sound, and design which cannot be achieved by conventional devices, as described above.

The mini component audio system has been described above as an example of electronic device 400 to which loudspeaker 300 is applied. However, the present disclosure is not limited thereto. For example, the present disclosure is applicable to a vehicular audio system, a portable audio device, and the like. In addition, the present disclosure can be widely applied to various electronic devices including video devices such as liquid crystal televisions or plasma display televisions, information communication devices such as mobile phones, and computer-related devices.

Fourth Exemplary Embodiment

Figure 7:
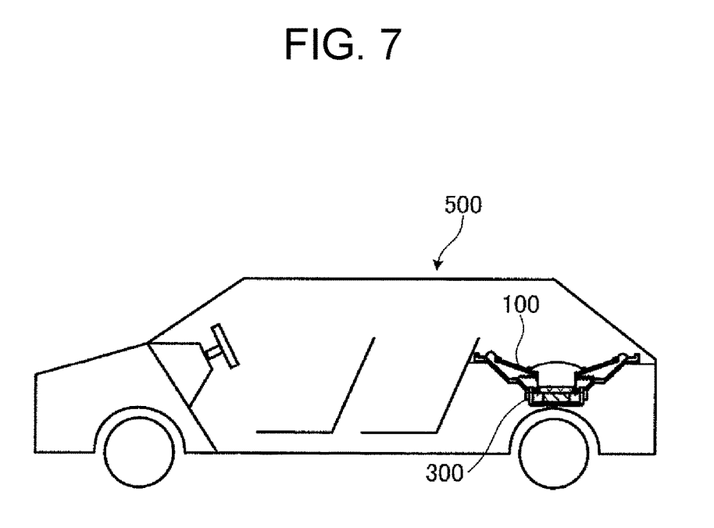
FIG. 7 is a schematic view illustrating an inside of a movable-body apparatus according to a fourth exemplary embodiment of the present disclosure.

Hereinafter, movable-body apparatus 500 according to a fourth exemplary embodiment will be described. FIG. 7 is a schematic view illustrating an inside of movable-body apparatus 500 according to the fourth exemplary embodiment of the present disclosure. Movable-body apparatus 500 is one of modes to which loudspeaker diaphragm 100 and loudspeaker 300 are applied. In the following description of the present exemplary embodiment, movable-body apparatus 500 is explained as a vehicle.

As illustrated in FIG. 7, loudspeaker 300 provided with loudspeaker diaphragm 100 according to the embodiment described hereinbefore is mounted in a rear tray or a front panel of movable-body apparatus 500. Loudspeaker 300 is configured to emit sound to the inside of movable-body apparatus 500 based on an audio signal transmitted from a car navigation system or a car audio system separately mounted to movable-body apparatus 500.

Loudspeaker diaphragm 100 mounted to movable-body apparatus 500 as described above is supposed to be left in a severe environment such as an environment having a large temperature difference, a humid environment, or a dry environment. However, loudspeaker diaphragm 100 has high durability by taking advantage of the feature of loudspeaker diaphragm 100 made of resin and is capable of providing excellent, high-accurate characteristics, sound, and design.

Note that the present disclosure is not limited to the above-mentioned exemplary embodiments. For example, another exemplary embodiment according to the present disclosure may be implemented by freely combining components described herein or excluding some of the components. Moreover, the present disclosure also includes modifications obtained by making various changes, which would be conceived by a person skilled in the art, to the above exemplary embodiments without departing from the scope and spirit of the present disclosure, that is, the meaning of the recitations in the claims.

For example, a surface of each of hollow glass member particles 102 may be treated in advance to improve adhesion to resin 101.

The loudspeaker diaphragm, the loudspeaker, and the production method for the loudspeaker diaphragm according to the present disclosure are applicable to electronic devices such as video and visual devices and information communication devices, movable-body apparatuses such as vehicles, and the like.

What is claimed is:

1. A loudspeaker diaphragm comprising:
   resin, the resin including:
   hollow glass member particles;
   a reinforcing material; and
   a compatibilizing agent that improves compatibility between the resin and the hollow glass member particles, wherein
   the reinforcing material is one or more materials selected from the group consisting of mica, carbon fiber, cellulose, and glass fiber,
   the compatibilizing agent is a resin modified with maleic acid anhydride,
   a thickness of each of the hollow glass member particles is greater than or equal to 0.6 µm and less than or equal to 3 µm, and
   a content of the hollow glass member particles contained in the resin is greater than or equal to 5 weight % and less than or equal to 40 weight %.

2. The loudspeaker diaphragm according to claim 1, wherein an average diameter of the hollow glass member particles is greater than or equal to 3 µm and less than or equal to 20 µm.

3. The loudspeaker diaphragm according to claim 1, wherein the resin further contains a material having high internal loss.

4. The loudspeaker diaphragm according to claim 1, wherein the resin further contains an antioxidant.

5. A loudspeaker comprising:
   the loudspeaker diaphragm according to claim 1;

a magnetic circuit provided with a magnetic gap;

a frame connected to the magnetic circuit; and a voice coil body having one end connected to the loudspeaker diaphragm and another end disposed inside the magnetic gap.

6. A production method for a loudspeaker diaphragm, the method comprising:

kneading resin containing hollow glass member particles;

injecting the resin into a cavity of a mold that is in a first state; and bringing the mold into a second state in which a volume of the cavity is smaller than a volume of the cavity in the first state after the injection of the resin, wherein the resin containing hollow glass member particles includes:

a reinforcing material; and a compatibilizing agent that improves compatibility between the resin and the hollow glass member particles, wherein the reinforcing material is one or more materials selected from the group consisting of mica, carbon fiber, cellulose, and glass fiber, the compatibilizing agent is a resin modified with maleic acid anhydride, a thickness of each of the hollow glass member particles is greater than or equal to 0.6 μm and less than or equal to 3 μm, and a content of the hollow glass member particles contained in the resin is greater than or equal to 5 weight % and less than or equal to 40 weight %.

7. The loudspeaker diaphragm according to claim 1, wherein the compatibilizing agent contained in the resin is greater than or equal to 1 weight % and less than or equal to 10 weight %.

* * * * *